(12) United States Patent
Wiedemeier et al.

(10) Patent No.: US 11,680,590 B1
(45) Date of Patent: Jun. 20, 2023

(54) ON-AXIS ACTUATOR FOR ROTATING BODIES

(71) Applicant: Naval Information Warfare Center Pacific, San Diego, CA (US)

(72) Inventors: Brandon J. Wiedemeier, San Diego, CA (US); Jeffrey M. Lloyd, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/956,646

(22) Filed: Sep. 29, 2022

(51) Int. Cl.
*F15B 15/02* (2006.01)
*F16H 25/20* (2006.01)

(52) U.S. Cl.
CPC ............. *F15B 15/02* (2013.01); *F16H 25/20* (2013.01)

(58) Field of Classification Search
CPC ........... F16H 25/20; F15B 15/02; F15B 15/14
See application file for complete search history.

(56) References Cited

U.S. PATENT DOCUMENTS

| | | | |
|---|---|---|---|
| 1,950,590 A * | 3/1934 | Berry ....................... | F01L 1/20 123/90.53 |
| 10,156,163 B2 * | 12/2018 | Stucchi ..................... | F01L 1/25 |
| 2014/0238231 A1 * | 8/2014 | Kim ......................... | F15B 18/00 92/33 |

* cited by examiner

*Primary Examiner* — Abiy Teka
(74) *Attorney, Agent, or Firm* — Naval information Warfare Center, Pacific; Kyle Eppele; Eric VanWiltenburg

(57) ABSTRACT

On-axis actuator system includes an actuator bracket formed with at least one bracket cavity. Actuator links couple open and close rollers. An actuator member coupled to close roller and disposed within an actuator housing. Moving the actuator member towards the actuator bracket presses the close roller against the bracket to rotate the bracket. A device coupled to the bracket rotates with the bracket.

14 Claims, 6 Drawing Sheets

ON-AXIS ACTUATOR FOR ROTATING BODIES

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 112861) is assigned to the United States Government and is available for licensing for commercial purposes. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil.

BACKGROUND OF THE INVENTION

Actuating rods attached to a rotating body will experience a moment or off-axis force that can cause friction, binding, and additional strengths than pure on-axis compression. Because of the magnitude of the on-axis force, the side-loads can be inefficient and introduce non-optimal complications in operation and design. In some use cases of actuating rods (e.g. push rods for internal combustion engines, piston rods, and pneumatic or hydraulic rams), the off-axis load inefficiencies are minimized by bearings, levers, and complex geometry. In addition, some uses are only unidirectional, so there is no possibility for opposing pressure. To minimize the weight, size, friction, complexity, and cost of actuated rods, an actuator that provides only on-axis forces is desired.

SUMMARY OF THE INVENTION

The present invention relates to an on-axis actuator for rotating a coupled body.

According to an illustrative embodiment of the present disclosure, an on-axis actuator system includes an actuator bracket formed with at least one bracket cavity. Actuator links couple open and close rollers. An actuator member coupled to close roller and disposed within an actuator housing. Moving the actuator member towards the actuator bracket presses the close roller against the bracket to rotate the bracket. A device coupled to the bracket rotates with the bracket.

According to a further illustrative embodiment of the present disclosure, the actuator member can be driven pneumatically, hydraulically, or mechanically/electrically. In at least some embodiments, an actuator housing is formed with first and second chambers that are filled with working fluid to move the actuator member and attached piston. In at least some embodiments, the actuator housing and actuator member are formed with threads such that rotating the actuator member moves the actuator member.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Throughout the several views, like elements are referenced using like references. The elements in the figures are not drawn to scale and some dimensions are exaggerated for clarity.

The detailed description of the invention particularly refers to the accompanying figures in which.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
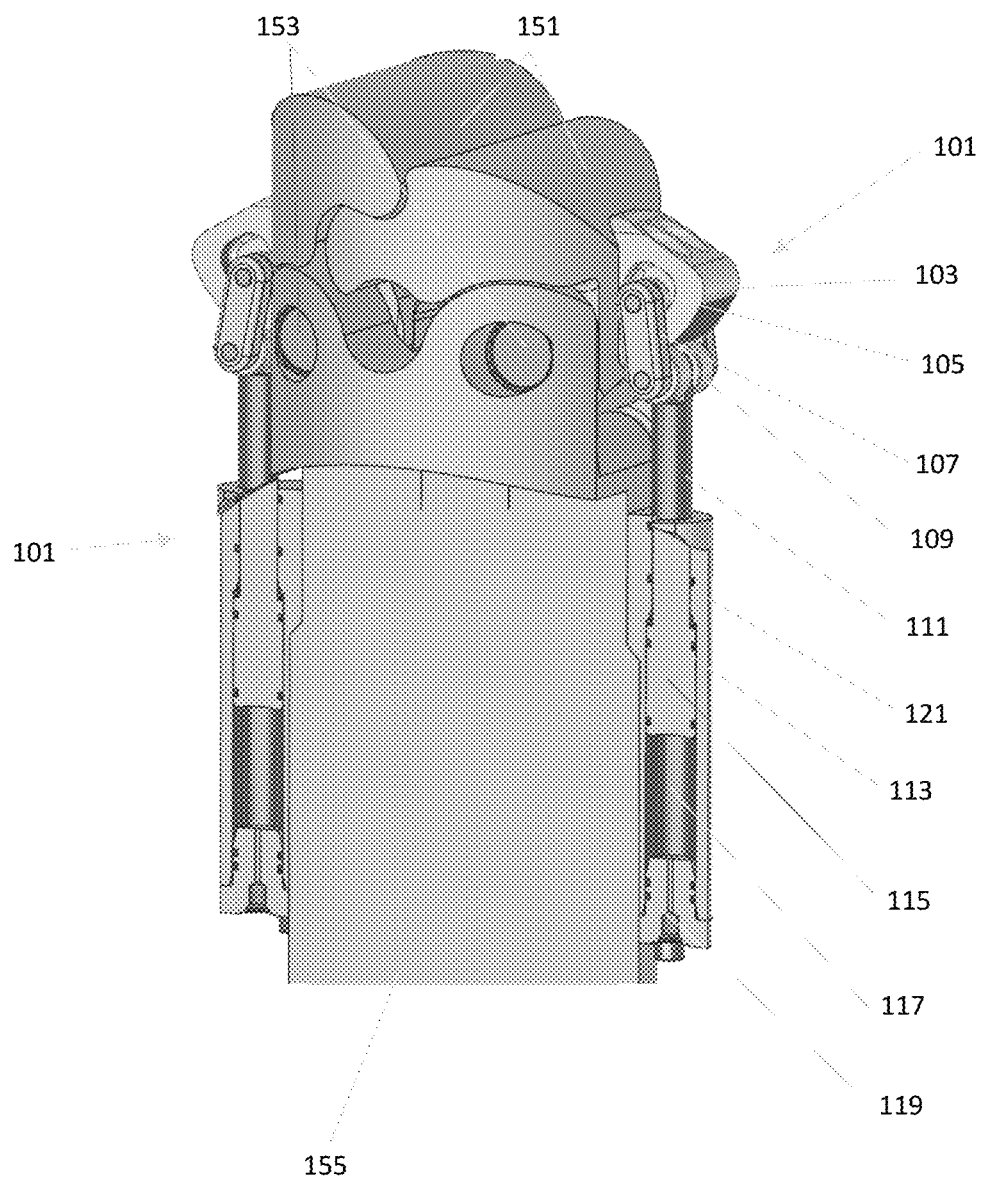
FIG. 1 shows an isometric partial cross-section view of an exemplary actuator system.
Figure 5:
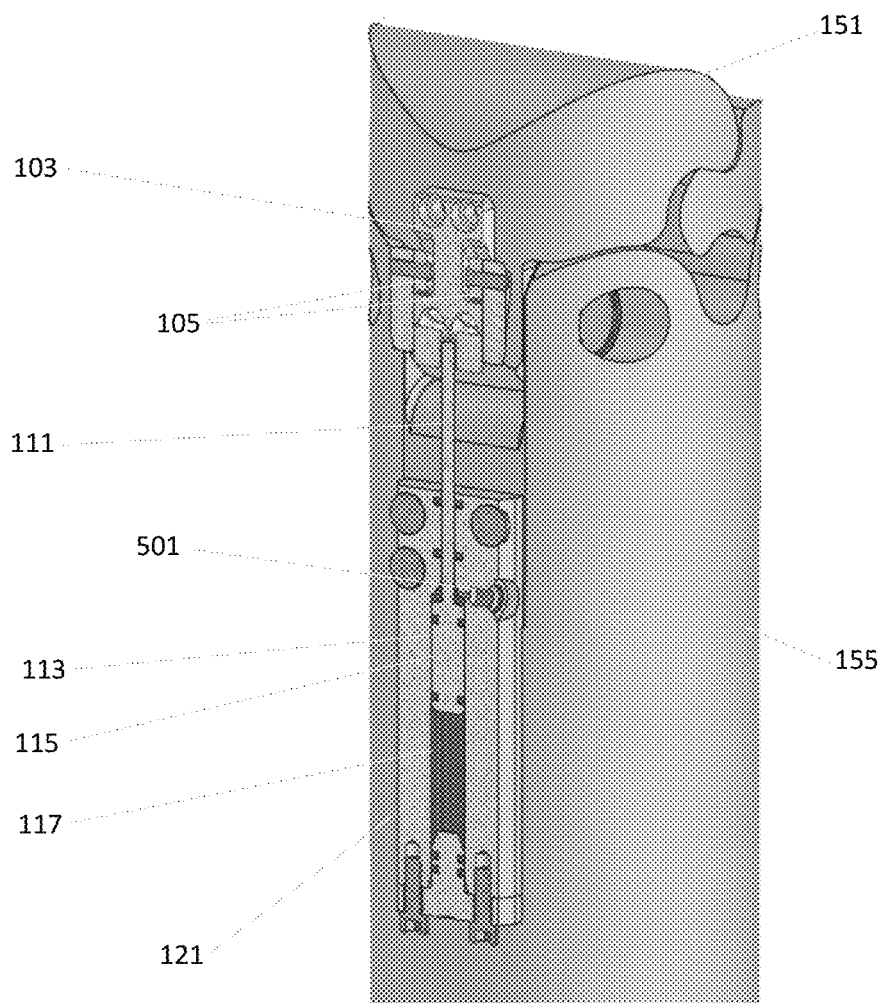
FIG. 5 shows an isometric cross-section view of an exemplary actuator system.

FIG. 1 shows an isometric partial cross-section view of an exemplary actuator system 101 for engaging rotating bodies 151 (e.g., clamps, crushers, cutters, etc.). Each actuator system 101 is designed to actuate the rotation of a coupled body 151. Each body 151 is coupled to a central housing 155 by a bearing 153. An actuator bracket 103 can be coupled to a body 151. An actuator link 107 can couple an open roller 105 to a close roller 109. Actuator link 107 can hold open roller 105 within a cavity formed on the side of actuator bracket 103. Open roller 105 can be coupled to actuator member 111. Actuator member 111 can be coupled to actuator piston 115 such that moving piston 115 moves the member 111. In at least some other embodiments, piston 115 can be any form of actuator block (e.g., a threaded component) that moves member 111. Actuator member 111 and piston 115 can be disposed within an actuator housing 121 that is coupled to central housing 155. For embodiments utilizing pneumatic or hydraulic actuation, actuator housing 121 can be formed with a close chamber 117 and an open chamber 113. Close chamber fitting 119 allows a working fluid to enter or exit the close chamber 117. When actuator system 101 is in an open position, piston 115 sits within close chamber 117. To close the rotating body 151, actuator 101 can be activated by inserting a working fluid into close chamber 117 through close chamber fitting 119. The increased pressure in close chamber 117 causes the actuator piston 115 and member 111 to move upwards. The close roller 109 rolls against actuator bracket 103, causing the rotating body 151 to roll into a closed position. At least some embodiments can include an open chamber fitting (as shown in FIG. 5). In other embodiments, open chamber 113 can include a force returning mechanism (e.g., a spring, a pocket of fluid, etc.) that tries to return the piston to the close position. Maintaining pressure in the close chamber 117 keeps the piston in the open chamber, and releasing the pressure in the close chamber returns the piston to the close position by allowing the force returning mechanism to return the piston. Central housing can house a variety of additional components such as electronics for actuator system 101, sensors, storage, cutting apparatus, etc.

Figure 2:
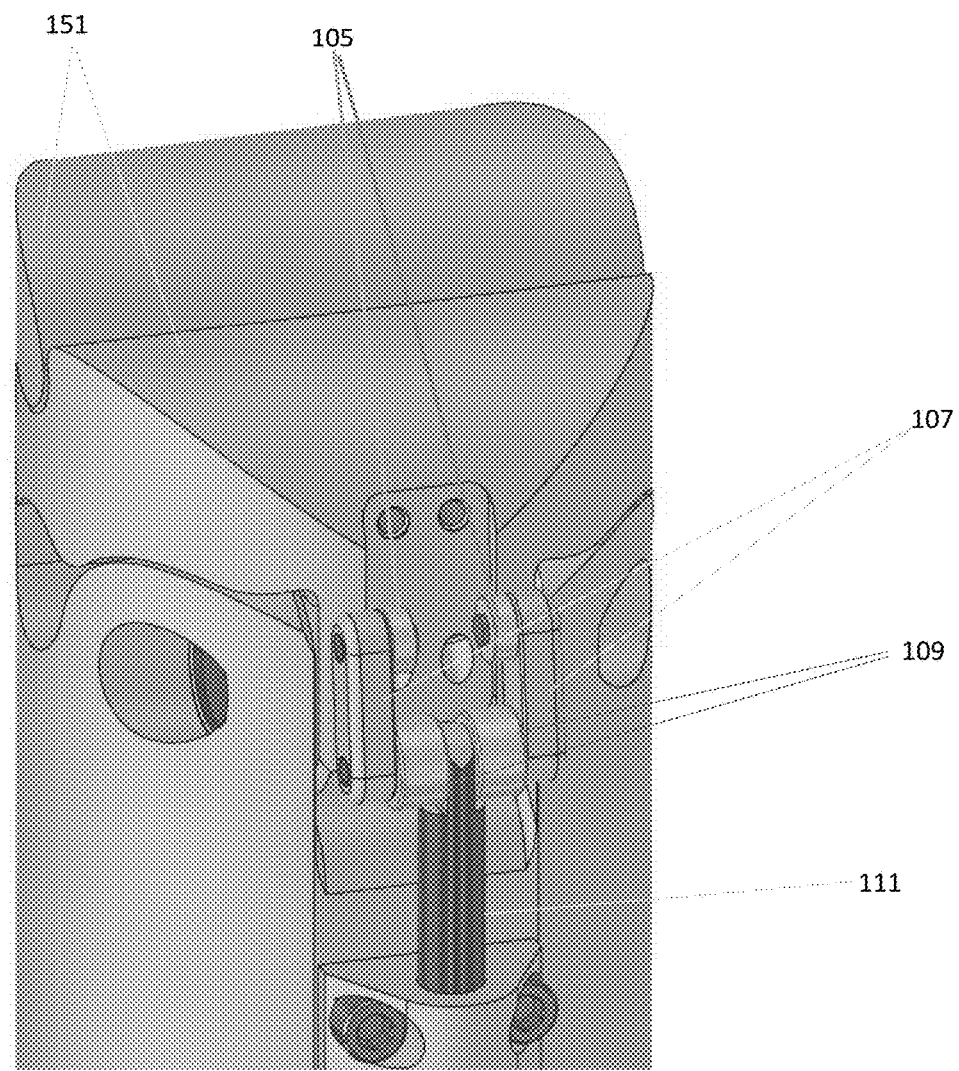
FIG. 2 shows an isometric view of an upper portion of an exemplary actuator system.

FIG. 2 shows an isometric view of an upper portion of an exemplary actuator system 101 with the actuator bracket removed. An actuator link 107 can couple an open roller 105 to a close roller 109. Two open rollers 105 can be used (as shown), wherein each open roll sits within opposing cavities of the actuator bracket, with two actuator links 107 coupling the open rollers 105 to the close roller 109. In alternative embodiments, the actuator bracket could be formed with a central profile cavity that passes through both sides such that a single open roller 105 could pass through the profile cavity with two actuator links 107 coupled to opposing ends of open roller 105. Because a profile cavity would reduce the strength of the actuator bracket, one may need to construct the actuator bracket with stronger materials compared to the dual cavity embodiments.

Figure 3:
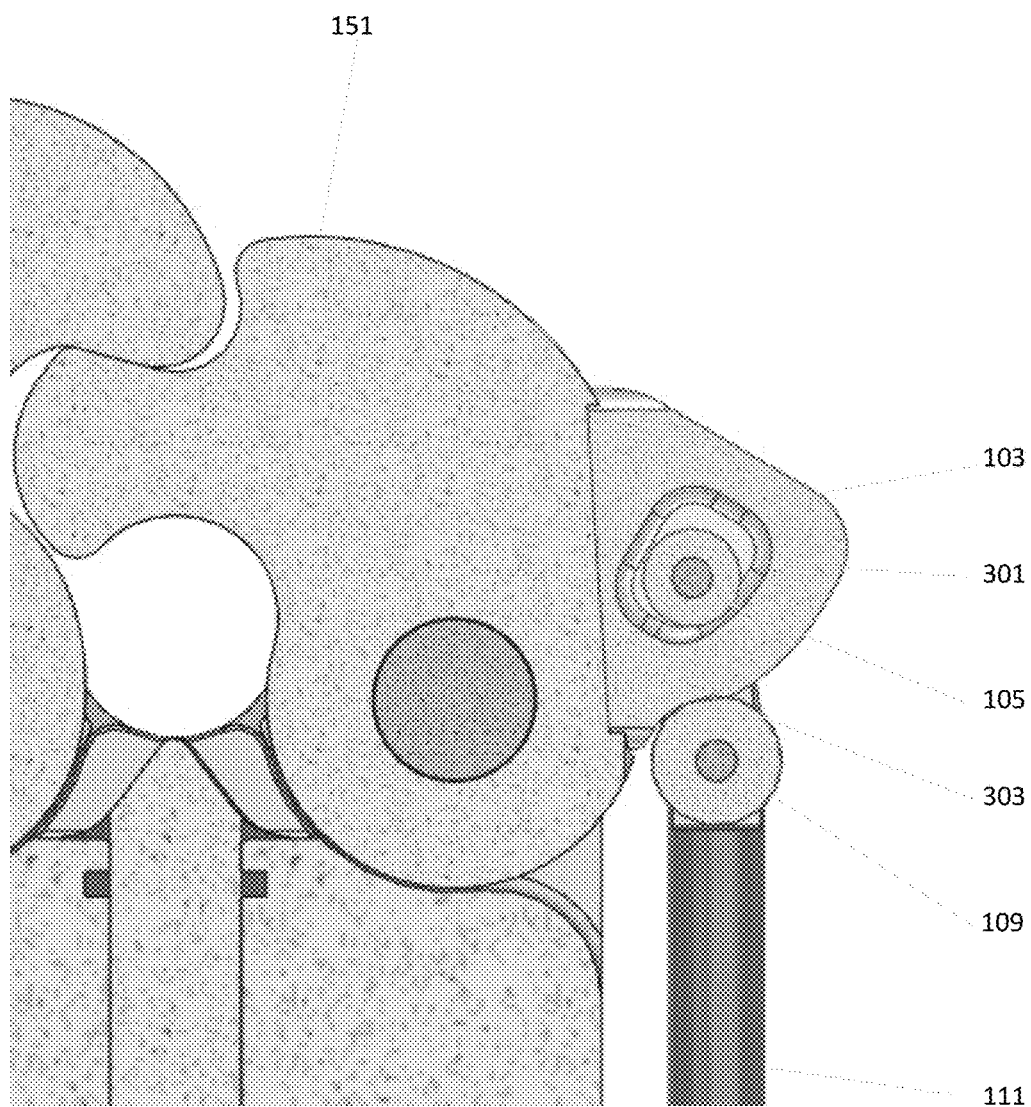
FIG. 3 shows a profile view of an upper portion of an exemplary actuator system.

FIG. 3 shows a profile view of an upper portion of an exemplary actuator system 101 with the actuator links removed. Actuator bracket 103 can be formed with opposing open profiles 301 and a close profile 303. Each open roller 105 sits within an open profile 301 of actuator bracket 103. The shape of open profile 301 is selected with a rounded edge of the open profile closest to the actuator such that the rotation of the open roller 105 rotates the rotating body 151 towards an open position. The shape of open profile 301 is selected such that the open roller does not reach the remaining edges due to the actuator link restricting the open roller's movement. The shape of close profile 303 is selected with a rounded edge such that the rotation of the close roller 109 rotates the rotating body 151 towards a closed position. The close profile 303 can extend along the entire length of actuator bracket 103 or just the sections of the actuator bracket which are in contact with the close roller 109. The arrangement of the actuator bracket 103, open profile 301, and close profile 303 to the rotating body 151 is somewhat arbitrary and could also be placed at any angle as long as the relative geometry is preserved (e.g., the orientation of the profiles with respect to the rollers).

Figure 4:
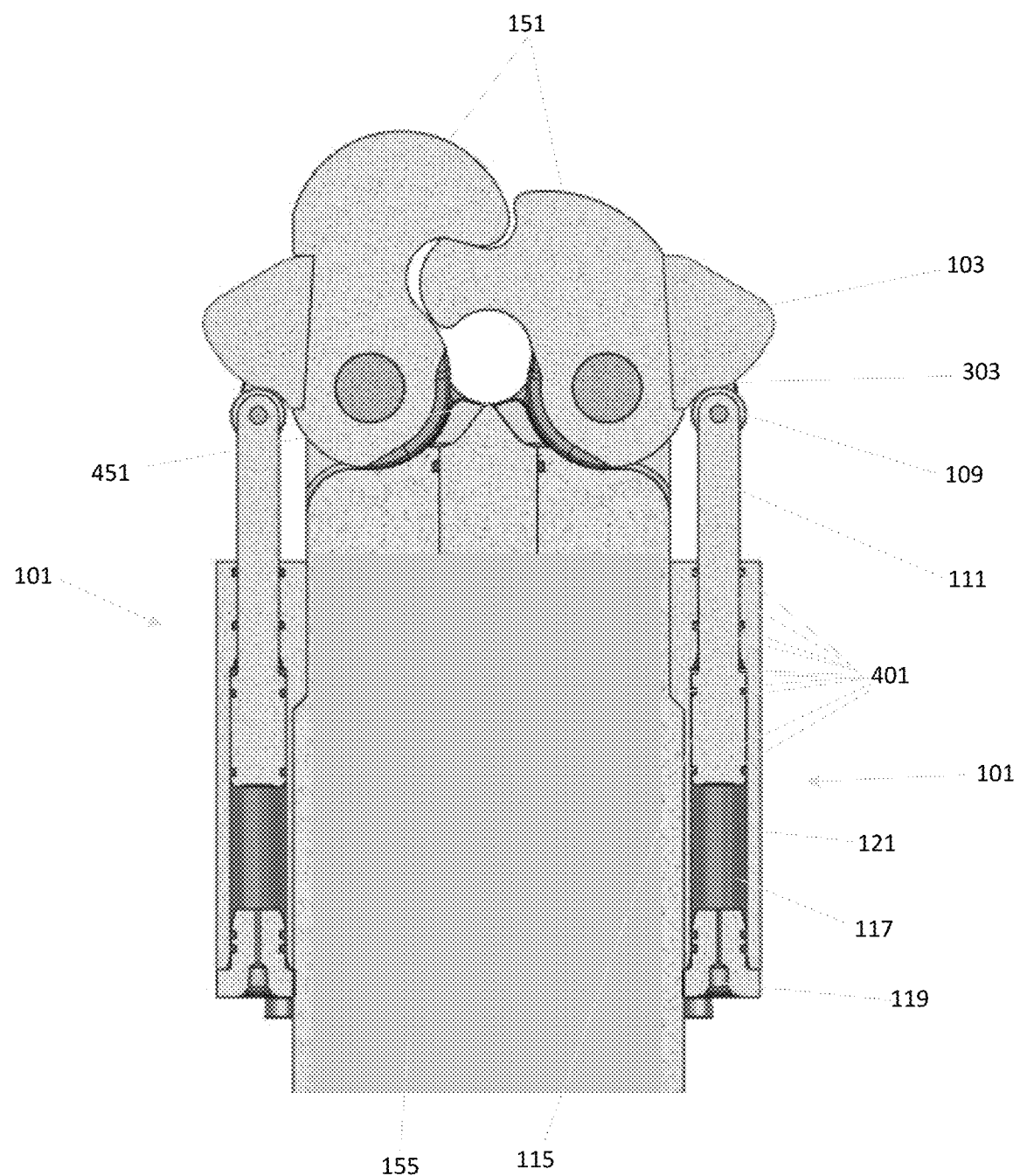
FIG. 4 shows a profile cross-section view of an exemplary actuator system.

FIG. 4 shows a profile cross-section view of an exemplary actuator system 101. In the depicted embodiment, actuator bracket 103 is not formed with a central profile cavity (e.g., supporting two separate close rollers) and is therefore shown with a solid center. For embodiments utilizing pneumatic or hydraulic actuation, plurality of seals 401 can maintain pressure in the open and close chambers. Central housing 155 can be formed with at least one central extension 451 that can provide additional force or friction. When an external object is held between rotating bodies 151, central extension 451 can help hold the external object in place to prevent the external from slipping in either direction. In at least some embodiments, a plurality of central extensions 451 can form a ring around an equipment cavity such that equipment within the cavity (e.g., sensors, probes, cutting tools, etc.) can be deployed to manipulate or otherwise interact with an external object held by the rotating bodies 151. In at least some embodiments, central extension 451 can include additional equipment such as sensors or probes that can invasively (e.g., cutting a hole and inserting a probe) or non-invasively (e.g., measuring with an ultrasound sensor) assess the external object. Rotating bodies 151 can be designed to geometrically lock such that one fits within another to help prevent unintentional disengagement when forces are applied to the bodies. In addition, the actuator system 101 is unable to open while force is applied to the rotating bodies, further protecting the system from unintentional disengagement.

FIG. 5 shows an isometric cross-section view of an exemplary actuator system. Open chamber fitting 501 allows a working fluid to enter or exit the open chamber 113. When actuator system 101 is in a closed position, piston 115 sits within open chamber 113. To open the rotating body 151, actuator 101 can be activated by inserting a working fluid into open chamber 113 through open chamber fitting 501. The increased pressure in open chamber 113 causes the actuator piston 115 and member 111 to move downwards. The open rollers 105 rolls against actuator bracket 103, causing the rotating body 151 to roll into an open position. At least some embodiments can include a close chamber fitting (as shown in FIG. 1). In other embodiments, close chamber 117 can include a force returning mechanism (e.g., a spring, a pocket of fluid, etc.) that tries to return the piston to the open position. Maintaining pressure in the open chamber 113 keeps the piston in the close chamber, and releasing the pressure in the open chamber returns the piston to the open position.

Figure 6:
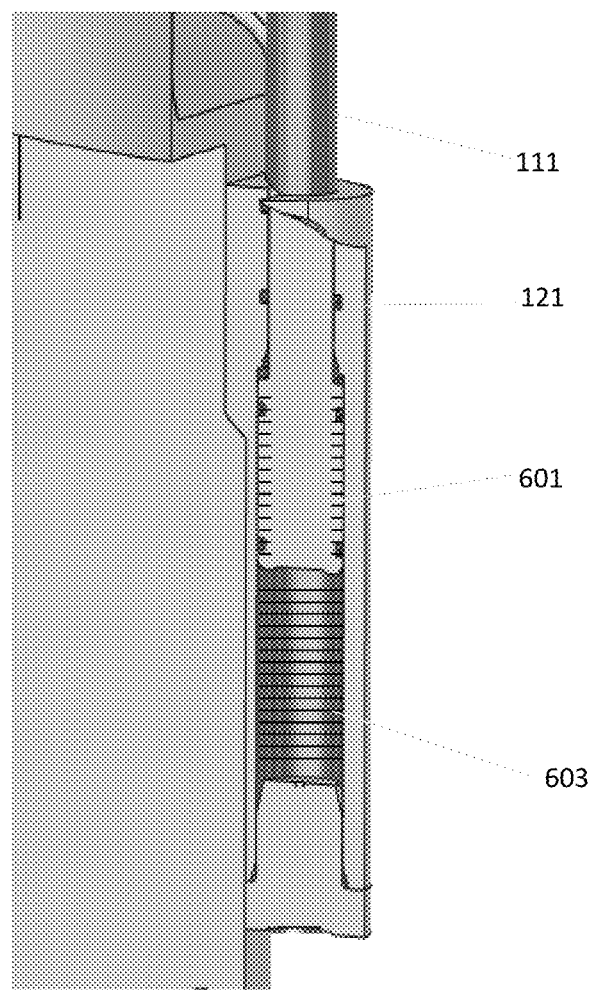
FIG. 6 shows an isometric cross-section view of a lower portion of an exemplary actuator system.

FIG. 6 shows an isometric cross-section view of a lower portion of an exemplary actuator system. Exemplary systems can be actuated electrically by using a screw member 601 instead of a piston. Actuator housing 121 can be formed with interior threads such that a motor can rotate screw member 601 through the threads, thereby raising or lowering actuator member 111. In other embodiments, actuator member 111 can be threaded such that a screw member 601 is not required and can be removed.

A wide variety of materials can be used in construction, but in general the force bearing components (e.g., the actuator member, the rollers, etc.) are subjected to the highest stresses and should therefore be made of higher strength materials (e.g., stainless steel, titanium, etc.). All components could be made of high strength materials, but this would be unnecessarily costly for related little gain. Instead, non-force bearing components could be made with alternative lower strength materials such as aluminum. For applications where high strength is not required, weaker materials could be used throughout the system. Exemplary systems have relatively small exposed surface areas, which minimizes exposure to environmental conditions to avoid fouling and corrosion. As such, selecting corrosion resistant materials is less important, but exposed surface areas can be made with corrosion resistant materials.

Although the invention has been described in detail with reference to certain preferred embodiments, variations and modifications exist within the spirit and scope of the invention as described and defined in the following claims.

The invention claimed is:

1. An actuator system comprising:
   an actuator bracket formed with at least one bracket cavity;
   at least one first roller;
   at least one second roller disposed within the at least one bracket cavity;
   first and second actuator links, wherein a first end of each link of the first and second actuator links is coupled to the at least one first roller and a second end of each link of the first and second actuator links is coupled to the at least one second roller;
   an actuator member having a first end and a second end, wherein the actuator member is coupled to the at least one first roller at the first end of the actuator member; and
   an actuator housing formed with a central cavity comprising a first chamber and a second chamber and formed with an aperture connecting the central cavity and exterior of the actuator housing;
   wherein the actuator member is partially disposed within the actuator housing such that the actuator member extends past the actuator housing through the aperture.

2. The system of claim 1, wherein the actuator bracket is formed with a first rotation profile on an exterior surface of the actuator bracket, wherein moving the at least one first roller towards the first rotation profile rotates the actuator bracket.

3. The system of claim 2, wherein the actuator bracket is formed with at least one second rotation profile on an interior surface of the at least one bracket cavity, wherein moving the at least one second roller towards the at least one second rotation profile rotates the actuator bracket.

4. The system of claim 3, further comprising:
a first chamber fitting coupled to the first chamber adapted to add and remove a working fluid from the first chamber;
a piston coupled to the second end of the actuator member;
a plurality of seals disposed between the actuator housing and the piston and the actuator housing and the actuator member;
wherein inserting the working fluid into the first chamber causes the piston and actuator member to move towards the actuator bracket.

5. The system of claim 4, further comprising a spring disposed in the second chamber such that the spring compresses when the actuator member moves towards the actuator bracket.

6. The system of claim 4, further comprising the working fluid disposed in the second chamber such that the working fluid compresses when the actuator member moves towards the actuator bracket.

7. The system of claim 4, further comprising:
a second chamber fitting coupled to the second chamber adapted to add and remove a working fluid from the second chamber;
wherein inserting the working fluid into the second chamber causes the piston and actuator member to move away from the actuator bracket.

8. The system of claim 4, further comprising a spring disposed in the first chamber such that the spring compresses when the actuator member moves towards the actuator bracket.

9. The system of claim 4, further comprising the working fluid disposed in the first chamber such that the working fluid compresses when the actuator member moves towards the actuator bracket.

10. The system of claim 3, further comprising:
a second chamber fitting coupled to the second chamber adapted to add and remove a working fluid from the second chamber;
a piston coupled to the second end of the actuator member;
a plurality of seals disposed between the actuator housing and the piston and the actuator housing and the actuator member;
wherein inserting the working fluid into the second chamber causes the piston and actuator member to away from the actuator bracket.

11. The system of claim 3, wherein an interior surface of the actuator housing is formed with a plurality of threads;
wherein the actuator member is formed with a plurality of threads such that rotating the actuator member moves the actuator member towards or away from the actuator bracket.

12. The system of claim 3, further comprising a clamp coupled to the actuator bracket, wherein rotating the actuator bracket rotates the clamp.

13. An actuator system comprising:
an actuator bracket formed with at least one bracket cavity;
at least one first roller;
at least one second roller disposed within the at least one bracket cavity;
first and second actuator links, wherein a first end of each link of the first and second actuator links is coupled to the at least one first roller and a second end of each link of the first and second actuator links is coupled to the at least one second roller;
an actuator member having a first end and a second end, wherein the actuator member is coupled to the at least one first roller at the first end of the actuator member; and
an actuator housing formed with a central cavity comprising an first chamber and a second chamber and formed with an aperture connecting the central cavity and exterior of the actuator housing;
a first chamber fitting coupled to the first chamber adapted to add and remove a working fluid from the first chamber;
a piston coupled to the second end of the actuator member;
a plurality of seals disposed between the actuator housing and the piston and the actuator housing and the actuator member;
wherein the actuator member is partially disposed within the actuator housing such that the actuator member extends past the actuator housing through the aperture;
wherein inserting the working fluid into the first chamber causes the piston and actuator member to move towards the actuator bracket.

14. An actuator system comprising:
an actuator bracket formed with at least one bracket cavity;
at least one first roller;
at least one second roller disposed within the at least one bracket cavity;
first and second actuator links, wherein a first end of each link of the first and second actuator links is coupled to the at least one first roller and a second end of each link of the first and second actuator links is coupled to the at least one second roller;
an actuator member having a first end and a second end, wherein the actuator member is coupled to the at least one first roller at the first end of the actuator member; and
an actuator housing formed with a central cavity comprising an first chamber and a second chamber and formed with an aperture connecting the central cavity and exterior of the actuator housing;
wherein the actuator member is partially disposed within the actuator housing such that the actuator member extends past the actuator housing through the aperture;
wherein an interior surface of the actuator housing is formed with a plurality of threads;
wherein the actuator member is formed with a plurality of threads such that rotating the actuator member moves the actuator member towards or away from the actuator bracket.

* * * * *